June 11, 1957  J. MARCO  2,795,207
APPARATUS FOR COATING FABRICS
Filed Aug. 10, 1954  9 Sheets-Sheet 1

INVENTOR
JOHN MARCO

ATTORNEYS

June 11, 1957 J. MARCO 2,795,207
APPARATUS FOR COATING FABRICS
Filed Aug. 10, 1954 9 Sheets-Sheet 9

INVENTOR
JOHN MARCO,
BY Jacobi & Jacobi
ATTORNEYS

United States Patent Office 2,795,207
Patented June 11, 1957

2,795,207

APPARATUS FOR COATING FABRICS

John Marco, Wilmington, Del., assignor to Marco Company, Inc., Saginaw, Mich., a corporation of Pennsylvania Application August 10, 1954, Serial No. 448,907

26 Claims. (Cl. 118—44)

This invention relates to the production of laminated fabric and more particularly to an apparatus and process for applying a backing such as foam rubber to carpets or the like.

Briefly stated the apparatus includes means for feeding a continuous fabric such as a carpet, applying a continuous coating of foam rubber of uniform thickness to one side of the fabric, gelling the foam rubber, vulcanizing the foam rubber and cooling the laminated fabric prior to winding the same in a roll for storage or other disposition.

The apparatus of this invention includes a spreader roll which is adjustable to vary the thickness of the coating of foam rubber applied to the fabric, a gelation roll for contacting the layer of foam rubber and gelling the same followed by a series of heated vulcanizing rolls arranged to provide a zig-zag path for the fabric during the vulcanizing operation. Suitable control means may be provided for accurately controlling the temperature of the gelation roll and the vulcanizing rolls. A cooling stage follows the vulcanizing stage and may well include a series of rolls over which the laminated fabric passes there being means to supply a cooling medium to the cooling rolls and also means to circulate air through the chamber in which the cooling rolls are located. If desired means may also be provided to emboss any appropriate design in the foam rubber prior to complete vulcanization.

It is therefore an object of the invention to provide an apparatus for producing a laminated fabric consisting of a layer of foam rubber applied to one side of a fabric such as a carpet or the like.

A further object of the invention is the provision of an apparatus for producing a laminated fabric consisting of a layer of foam rubber applied to one side of a fabric such as a carpet or the like in which the foam rubber is gelled, progressively vulcanized and the laminated fabric cooled prior to winding in a roll for storage.

A still further object of the invention is the provision of an apparatus for producing a laminated fabric consisting of a layer of foam rubber applied to one side of a fabric such as a carpet or the like in which means is provided for embossing any desired design in the foam rubber.

Another object of the invention is the provision of an apparatus for producing a laminated fabric consisting of a layer of foam rubber applied to one side of a fabric such as a carpet or the like in which means is provided for varying the thickness of the foam rubber layer and in which means is further provided for maintaining the thickness of the layer of foam rubber uniform.

A further object of the invention is the provision of an apparatus for producing laminated fabric consisting of a layer of foam rubber applied to one side of a fabric such as a carpet or the like in which during vulcanization the foam rubber and fabric alternately engage heated rolls or drums in order to rapidly impart heat to the foam rubber and to permit the escape of moisture and vapors therefrom.

A still further object of the invention is the provision of an apparatus for producing laminated fabric consisting of a layer of foam rubber applied to one side of a fabric such as a carpet or the like in which means is provided for draining or permitting the escape of condensate from the heated rolls or drums.

Another object of the invention is the provision of an apparatus for producing a laminated fabric consisting of a layer of foam rubber applied to one side of a fabric such as a carpet or the like in which means is provided for partially cooling a limited surface area of the gelation roll immediately prior to contact of the same with the foam rubber.

A further object of the invention is the provision of a method of continuously producing laminated fabric consisting of a layer of foam rubber applied to one side of a fabric such as a carpet or the like.

Further objects and advantages of the invention will be apparent from the following description taken in conjunction with the accompanying drawings in which:

Fig. 3, a top plan view of the apparatus with the housing in section in order to clearly show the portions of the apparatus disposed within the housing;

Fig. 9, a vertical sectional view to an enlarged scale showing the means for applying a coating of foam rubber to one surface of the fabric and the means for partially cooling a limited surface area of the gelation roll;

With continued reference to the drawings there is shown a supply of fabric such as a carpet in the form of a roll 10 rotatably mounted on a suitable support 11. From the roll 10 the fabric 12 passes over a spreader roll 13 rotatably mounted on a support 14. As best shown in Fig. 9 the supporting shaft 15 of the spreader roll 13 may be rotatably mounted at each end in bearing blocks 16 which are slidably mounted on guides 17 and 18 carried by the support 14. The bearing blocks 16 are normally urged in one direction by compression springs 19 engaging a member 20 connecting the guides 17 and 18 and the other end of the compression spring 19 engaging bearing blocks 16. The bearing blocks 16 may be moved against the action of compression springs 19 to adjust the position of spreader roll 13 by a jack screw 21 threadedly engaging a member 22 connecting the guides 17 and 18 and with the ends of jack screw 21 engaging the bearing block 16. A lock nut 23 may be received on the jack screw 21 to securely lock such jack screw against inadvertent movement after adjustment of the position of spreader roll 13 has been completed.

Spreader roll 13 may be driven by a chain or other suitable power transmission means 24 which in turn is driven by a suitable motor 25.

Mounted for rotation at substantially the same level and parallel to the spreader roll 13 is a gelation roll 26. The axis of gelation roll 26 is fixed and the spacing between this roll and spreader roll 13 is adjusted by the jack screws 21 described above for a purpose which will presently appear.

Figures 15, 16, 17:
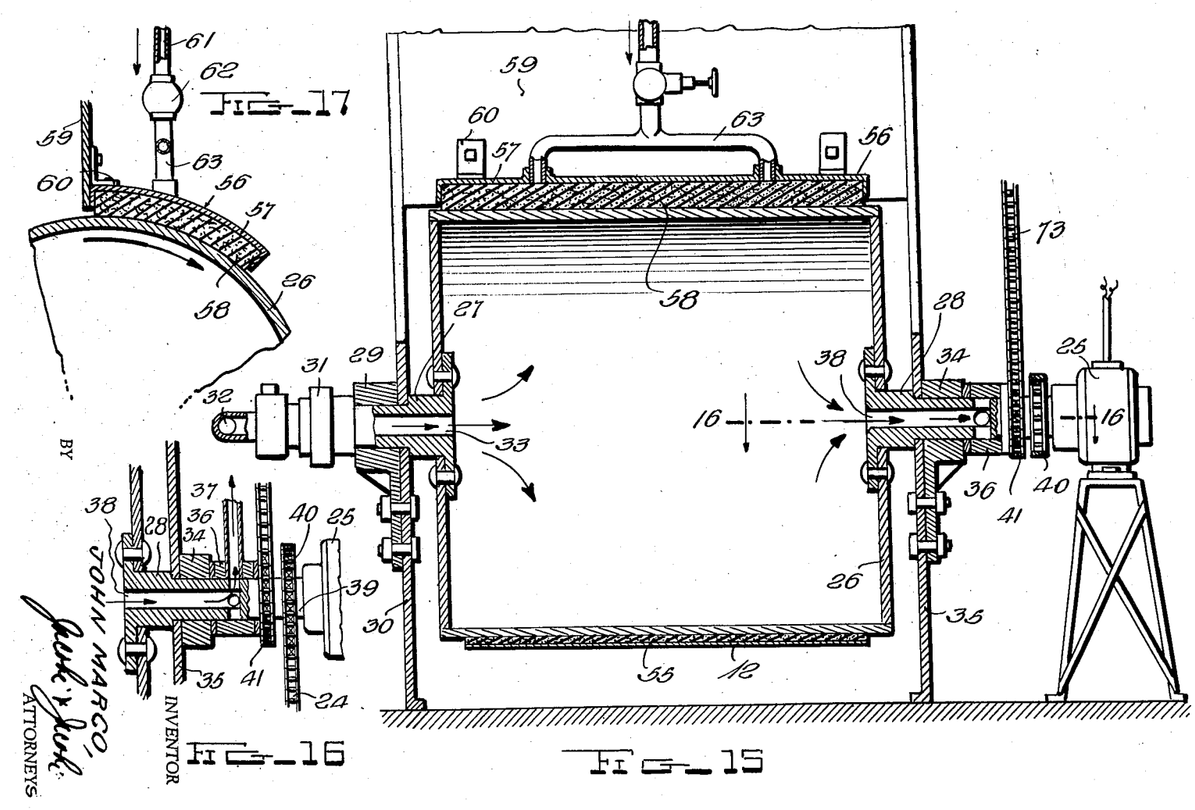
Fig. 15, a sectional view on the line 15—15 of Fig. 10 and showing the structure of the gelation roll, the mounting and drive means therefor and the means for partially cooling a limited surface area thereof.
Fig. 16, a fragmentary sectional view on the line 16—16 of Fig. 15 and showing the drive means for the gelation roll and the outlet for the heating medium.
Fig. 17, a fragmentary sectional view to an enlarged scale showing the means for partially cooling a limited surface area of the gelation roll.

Since it is necessary that gelation roll 26 be heated during rotation thereof means is provided to conduct heating medium to the interior of such roll and exhaust the same therefrom and as best shown in Figs. 15 and 16 the gelation roll 26 is provided with trunnions 27 and 28 at each end thereof. Trunnion 27 is mounted for rotation in a bearing 29 mounted on a support 30 and forming a part of the bearing 29 is a rotary coupling 31 to which is attached a heating medium supply conduit 32. Trunnion 27 is provided with a passage 33 communicating with the interior of gelation roll 26 and through the rotary coupling 31 with the supply conduit 32.

The trunnion 28 is rotatably mounted in a bearing 34 carried by a support 35 and forming a part of the bearing 34 is a rotary coupling 36 to which is attached an exhaust conduit 37. Trunnion 28 is provided with a passage 38 communicating with the interior of gelation roll 26 and through the coupling 36 with the exhaust conduit 37. The trunnion 28 extends beyond the rotary coupling 36 to provide a shaft 39 coupled to the motor 25 to provide driving power for rotating the gelation roll 26 and also mounted on shaft 39 is a sprocket 40 engaging chain 24 to drive spreader roll 13 and a second sprocket 41 the purpose of which will be presently described is also fixed on the shaft 39.

With particular reference to Figs. 7, 9, 10 and 11 a trough 42 is mounted between the spreader roll 13 and the gelation roll 26 somewhat above the horizontal center line of these two rolls. Trough 42 may receive foam rubber 43 from a nozzle 44 disposed above the open upper side of trough 42 and nozzle 44 may be supplied with foam rubber through a conduit 45 connected to any suitable source such as a foam rubber generator. In order to deposit the foam rubber 43 evenly in the trough 42 results in an even distribution of the foam rubber outlets 46 and 47 connected to the supply conduit 45 through a control valve 48. Also the nozzle 44 may be mounted for reciprocation above the trough 42 and for this purpose the nozzle 44 may be provided with a cross head 49 slidably received on spaced bars 50 and 51 secured at their ends to a support 52. A pitman 53 is connected at 54 to the nozzle 44 and may be reciprocated by any suitable mechanism. It will therefore be seen that the provision of a plurality of outlets on the nozzle 44 and the reciprocation of such nozzle above the trough 42 results in an even distribution of the foam rubber therein.

As will be seen from an inspection of Fig. 9 the fabric 12 passes over the upper side of spreader roll 13 downwardly between spreader roll 13 and gelation roll 26 and under gelation roll 26. Foam rubber deposited in the trough 42 flows through the open lower side thereof into the space between the fabric 12 in engagement with the surface of spreader roll 13 and the adjacent surface of gelation roll 26. The thickness of the layer of foam rubber 55 applied to the surface of fabric 12 will be governed by the distance between spreader roll 13 and gelation roll 26 which distance, as described above, may be adjusted.

Since gelation roll 26 is heated and since such heat must not be imparted too rapidly to the layer of foam rubber 55 means is provided to render such heating somewhat progressive in nature by providing means for partially cooling a limited surface area of the gelation roll 26 and as best shown in Figs. 9, 15 and 17, this cooling means may well comprise a shoe 56 disposed above gelation roll 26 adjacent the upper side of trough 42. Shoe 56 may include a housing 57 within which is secured a sponge 58 of rubber or other suitable material, this sponge being in contact with the surface of gelation roll 26. As will be seen from an inspection of the drawings the sponge 58 is of limited extent and engages only a relatively small surface area of the gelation roll 26 immediately prior to the contact of such surface with the layer of foam rubber 55 deposited from the trough 42 on the fabric 12. The housing 57 may be attached to a suitable bracket 59 by angle irons or the like 60 and the sponge 58 may be supplied with a cooling medium such as water through a conduit 61, a control valve 62 and a branch connection 63 communicating with the interior of the housing 57 and serving to deliver such cooling medium to the sponge 58.

Figure 1:
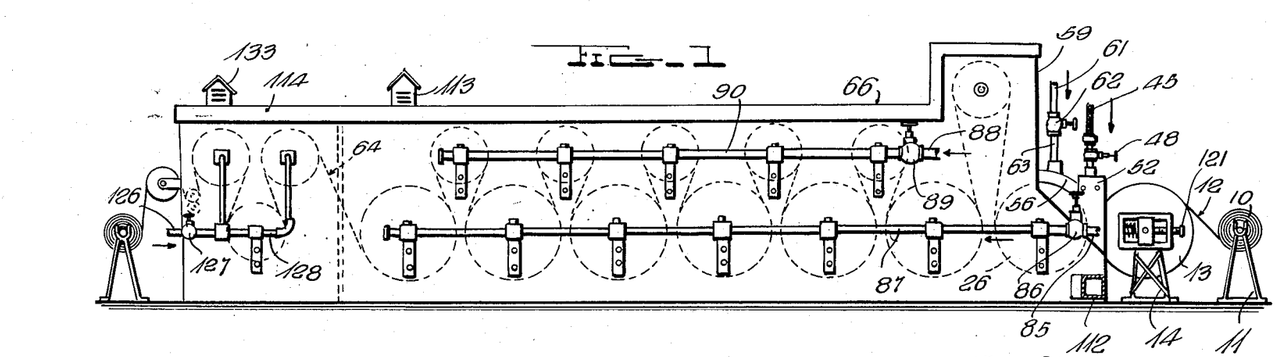
Fig. 1 is a side elevation view of the apparatus of this invention.
Figure 2:
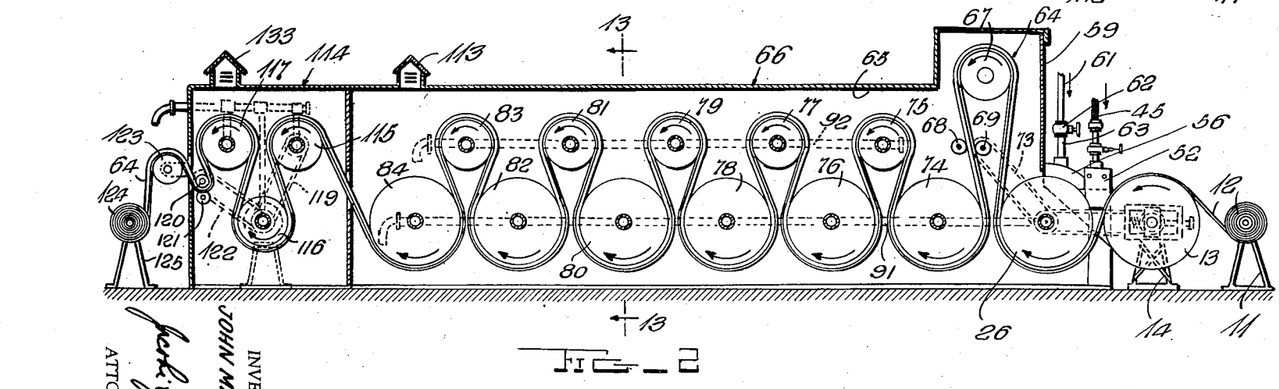
Fig. 2, a view similar to Fig. 1 but with the housing in section in order to clearly show the internal structure of the apparatus.
Figure 4:
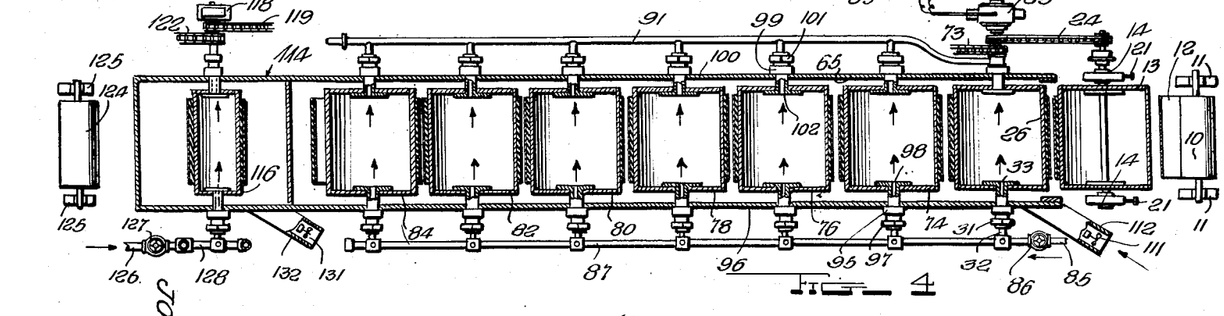
Fig. 4, a horizontal sectional view of the complete apparatus.
Figure 5:
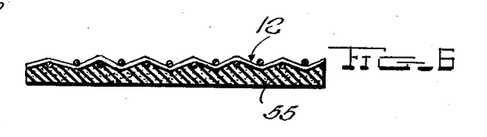
Fig. 5, a fragmentary view showing a portion of the laminated fabric produced in the apparatus of this invention.
Figure 6:
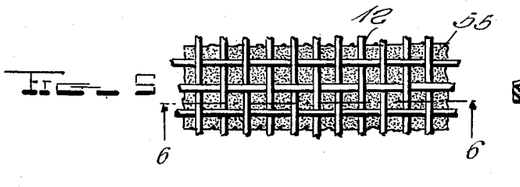
Fig. 6, a sectional view on the line 6—6 of Fig. 5.
Figures 7, 8:
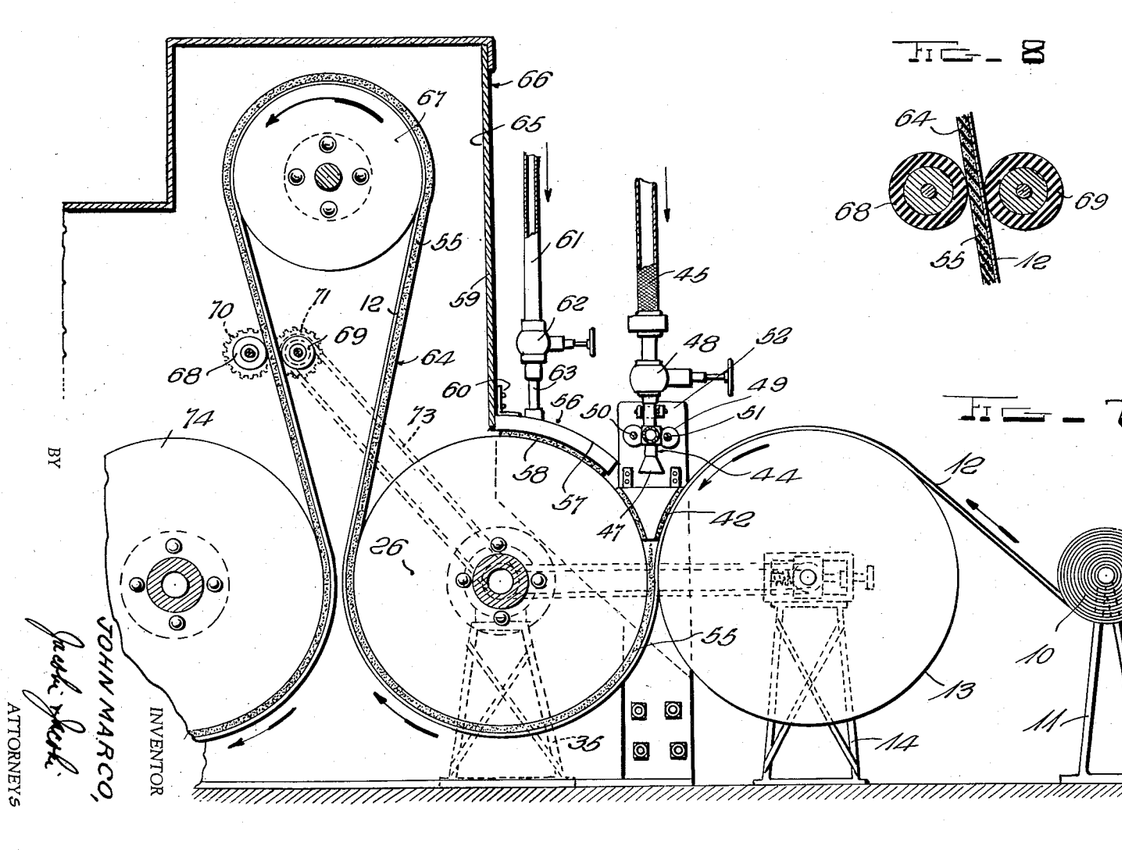
Fig. 7, a fragmentary side elevational view with parts in section for greater clarity and showing the relative arrangement of the spreader roll, the means for applying foam rubber to the surface of the fabric, the gelation roll and a portion of the vulcanizing section together with the feed rolls for maintaining a constant tension in the fabric passing under the gelation roll.
Fig. 8, a sectional detail view showing the feed rolls in engagement with the laminated fabric.
Figure 10:
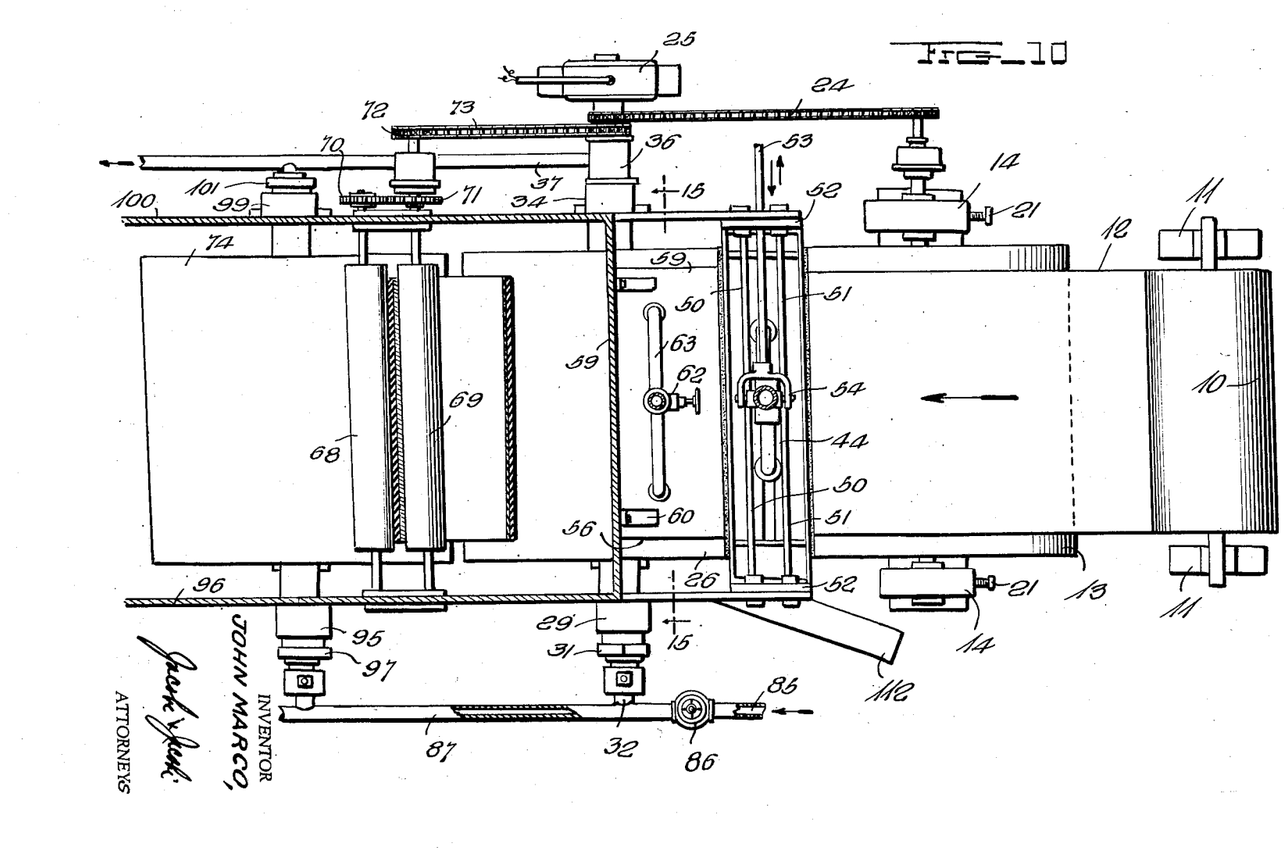
Fig. 10, a top plan view with parts in section for greater clarity and showing the portion of the apparatus shown in Fig. 7.
Figures 11, 12:
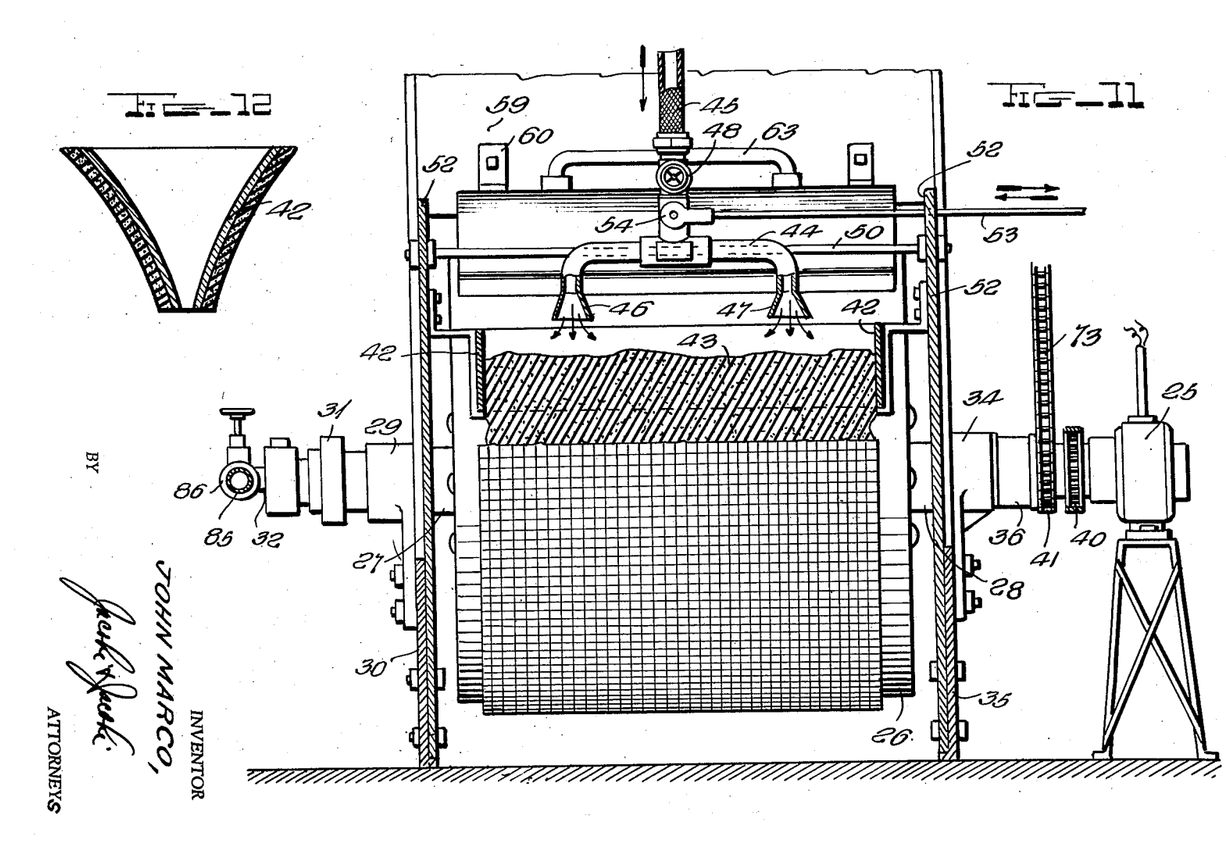
Fig. 11, a transverse sectional view showing the mechanism for feeding and applying foam rubber to the fabric.
Fig. 12, a sectional view to an enlarged scale and showing the trough for receiving and applying foam rubber to the fabric.

As best shown in Fig. 7 the laminated fabric 64 passes upwardly from gelation roll 26 into a vulcanizing chamber 65 formed by a housing 66 and over a first heated vulcanizing roll 67 rotatably mounted in the side walls of housing 65. It is to be noted that the fabric 12 of the laminated fabric 64 is in contact with the surface of first vulcanizing roll 67 and with the layer of foam rubber 55 exposed which results in imparting heat to the laminated fabric 64 and at the same time permits the escape of moisture or vapor from the foam rubber layer 55.

From first vulcanizing roll 67 the laminated fabric 64 passes downwardly between a pair of feed rolls 68 and 69. In order that feed rolls 68 and 69 will rotate in synchronism they may be provided at one end with meshing pinion gears 70 and 71 and feed roll 69 may be provided with a sprocket 72 engaging a chain or other suitable power transmission means 73 which in turn engages sprocket 41 on shaft 39 which results in driving feed rolls 68 and 69 from motor 25. Since feed rolls 68 and 69 operate in synchronism with the rotation of gelation roll 26 a constant tension is maintained in the laminated fabric 64 between the feed rolls 68 and 69 and the gelation roll 26 which results in maintaining a uniform thickness of the layer of foam rubber 25 and eliminates thin spots which might be caused by uneven pressure of the layer of foam rubber 55 against the surface of gelation roll 26. This is extremely important since at this stage in the process the layer of foam rubber 55 is still in a substantially fluid state and any variation in the pressure between such foam rubber and the surface of gelation roll 26 would result in flow of the rubber and a consequent variation in the thickness of the foam rubber layer 55.

While feed rolls 68 and 69 are provided primarily for the purpose described above, nevertheless, if desired these rolls may be made to serve another purpose by providing a suitable configuration to the surface of roll 68 which would result in embossing any desired design in the surface of the foam rubber layer 55. In view of the partial vulcanization of the foam rubber at this point the embossed design will retain its configuration until vulcanization is completed in the following portion of the apparatus.

After leaving feed rolls 68 and 69 the laminated fabric 64 engages a series of heated vulcanizing rolls 74, 75, 76, 77, 78, 79, 80, 81, 82, 83, and 84, which rolls are rotatably mounted in the walls of the housing 66. These vulcanizing rolls are not driven but are freely rotatable and are rotated solely by engagement with the moving laminated fabric 64. It is to be noted that the layer of foam rubber 55 is in direct contact with the vulcanizing rolls 74, 76, 78, 80, 82, and 84, while the fabric 12 is in engagement with the surface of vulcanizing rolls 75, 77, 79, 81, and 83 and during engagement with these latter rolls the foam rubber layer 55 is exposed which permits the rapid escape of moisture and vapor. Since the vulcanizing rolls are arranged in staggered relationship a relatively long path of travel is obtained while still maintaining the total length of the housing 66 at a minimum.

The lower series of vulcanizing rolls may be supplied with a suitable heating medium through a conduit 85, control valve 86 and a header 87 and the upper series of vulcanizing rolls may be supplied with a suitable heating medium through a conduit 88, control valve 89 and a header 90. Exhaust headers 91 and 92 serve to permit the escape of heating medium from the vulcanizing rolls. Since the mounting of all of the vulcanizing rolls is similar it is believed that a description of the mounting of one upper and one lower roll will suffice and such description will now be made with particular reference to Fig. 13.

Figures 13, 14:
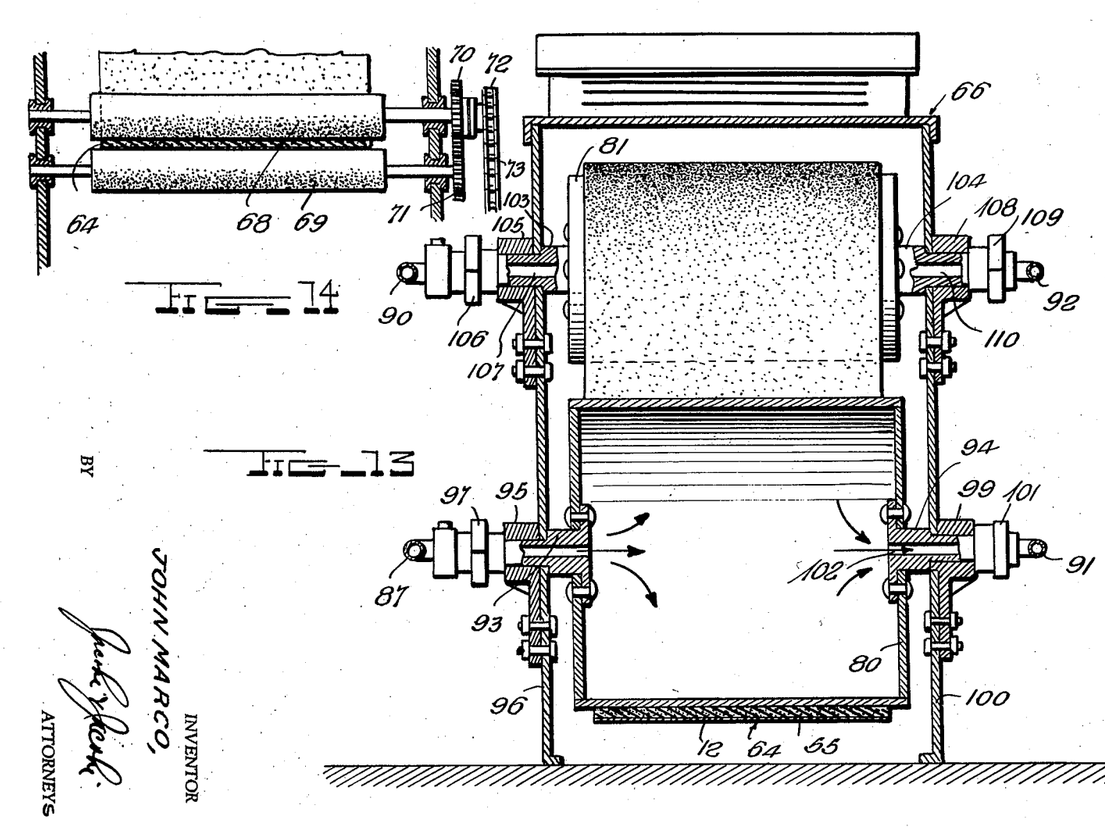
Fig. 13, a sectional view on the line 13—13 of Fig. 2 and showing a means for mounting the vulcanizing rolls and the means for supplying a heating medium thereto.
Fig. 14, a further detail view of the feed rolls shown in Figs. 7 and 8.

Vulcanizing roll 80 is provided with trunnions 93 and 94 at each end thereof, trunnion 93 being rotatably mounted in a bearing 95 carried by the side walls 96 of the housing 66. Forming a part of the bearing 95 is a rotary coupling 97 which is connected to heating medium supply header 87. A passage 98 in the trunnion 93 communicates with the interior of vulcanizing roll 80 and serves to conduct heating medium from the supply header 87 to the interior of such roll. Trunnion 94 is rotatably mounted in a bearing 99 carried by the side wall 100 of the housing 66 and forming a part of bearing 99 is a rotary coupling 101 connected to exhaust header 91. A passage 102 in the trunnion 94 communicates with the interior of vulcanizing roll 80 and serves to conduct heating medium therefrom through the rotary coupling 101 to the exhaust header 91.

Upper vulcanizing roll 81 is provided with trunnions 103 and 104 at each end thereof, trunnion 103 being rotatably mounted in a bearing 105 carried by side wall 96 of housing 66. Forming a part of bearing 105 is a rotary coupling 106 to which is attached heating medium supply header 90. Trunnion 103 is provided with a passage 107 communicating with the interior of vulcanizing roll 81 which passage 107 serves to conduct heating medium from the supply header 90 to the interior of vulcanizing roll 81. Trunnion 104 is rotatably mounted in a bearing 108 carried by the side wall 100 of the housing 66 and forming a part of the bearing 108 is a rotary coupling 109 which is attached to exhaust header 92. A passage 110 in the trunnion 104 serves to conduct heating medium from the vulcanizing roll 81 to the exhaust header 92.

Since moisture and vapors are emitted from the laminated fabric during the vulcanizing operation it is highly desirable to provide means for removing such moisture and vapors from the vulcanizing chamber and for this purpose a blower 111 is provided which serves to circulate air through an inlet conduit 112 into the housing 66 forming the vulcanizing chamber, this air moving from one end of the chamber to the other and combining with the moisture and vapors therein, the resulting gas escaping through one or more vents 113 disposed in the top wall of the housing 66.

From the vulcanizing chamber formed by the housing 66 the laminated fabric 64 passes into a cooling chamber formed by a housing 114 which may constitute a continuation of housing 66 or may be constructed as a separate unit. Within the cooling chamber there are mounted cooling rolls 115, 116 and 117, which may be rotatably driven from a motor 118 through suitable power transmission means such as chains 119. Any number of the cooling rolls may be driven but as shown in the drawings only rolls 115 and 116 are driven.

Following roll 117 is a pair of feed rolls 120 and 121 which engage the laminated fabric 64 and which are driven through a suitable transmission means such as a chain 122 from motor 118. From feed rolls 120 and 121 the laminated fabric 64 passes over an idler roller 123 to a roll 124 carried by a suitable support 125, the laminated fabric 64 being wound on roll 124 in any desired length for storage or other disposition.

Cooling rolls 115, 116 and 117 may be supplied with a cooling medium such as water through a conduit 126, a control valve 127 and a supply header 128 communicating with the interior of each of these rolls. The cooling medium may be removed from the rolls 115, 116 and 117 through an exhaust header 129 communicating with the interior of each of the rolls and an exhaust conduit 130. Means is also provided in the form of a blower 131 for circulating air through an inlet conduit 132 into the interior of the cooling chamber to remove moisture and vapors therefrom through a vent 133 disposed in the top wall of the housing 114 forming the cooling chamber.

In view of the fact that the heating medium employed in the vulcanizing rolls and gelation roll may be steam which would result in the collection of condensate within such rolls means has been provided to effectively remove such condensate from the interior of these rolls and this means will now be described with particular reference to Figs. 18 to 22.

Figures 18, 19, 20, 21, 22:
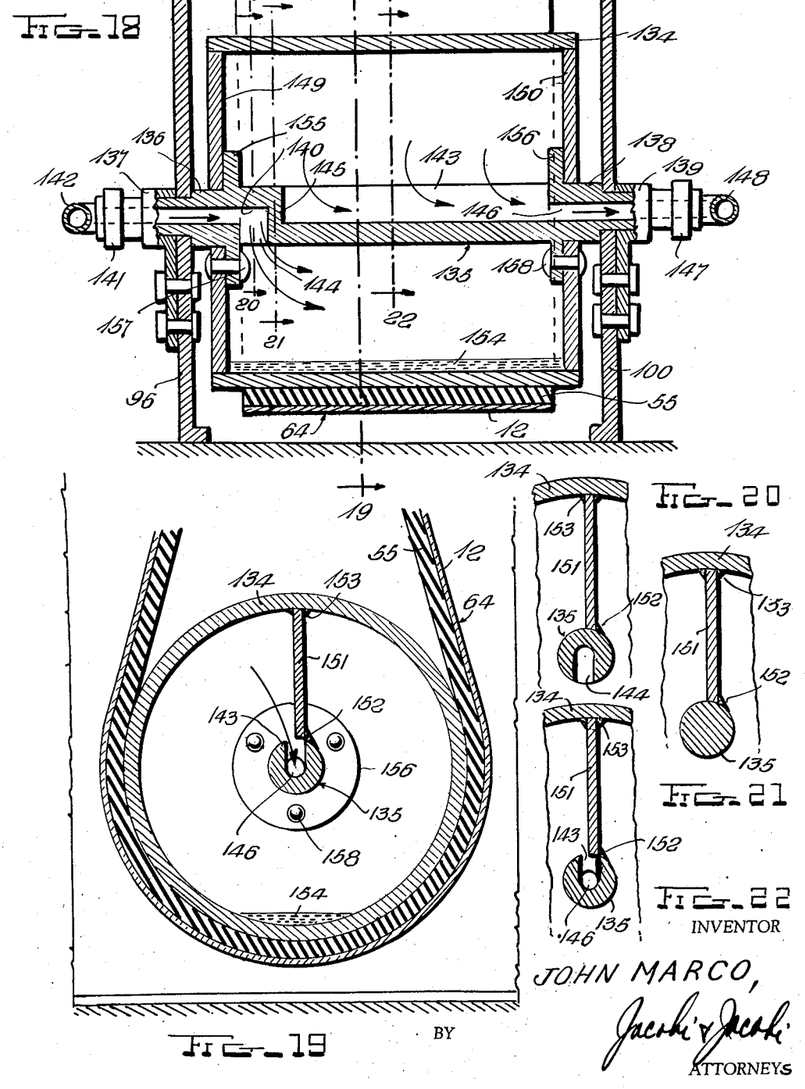
Fig. 18, a transverse sectional view of a modified vulcanizing or gelation roll and showing the mounting therefor, the means for supplying heating medium thereto and a means for removing condensate from the interior of the roll.
Fig. 19, a sectional view on the line 19—19 of Fig. 18 and showing the baffle within the roll for facilitating removal of condensate therefrom.
Fig. 20, a fragmentary sectional view on the line 20—20 of Fig. 18 and showing the relationship of the baffle within the roll to the heating medium inlet.
Fig. 21, a fragmentary sectional view on the line 21—21 of Fig. 18.
Fig. 22, a fragmentary sectional view similar to Fig. 20 on the line 22—22 of Fig. 18 and showing the relationship of the baffle to the heating medium outlet.

In these figures the roll 134 may represent any one of the vulcanizing rolls or the gelation roll and as shown roll 134 is carried by a shaft 135, one end of which 136 is rotatably mounted in a bearing 137 carried by the side wall 96 of the housing 66. The opposite end 138 of the shaft 135 is rotatably mounted in a bearing 139 carried by the side wall 100 of the housing 66. Shaft 135 is provided in the end 136 with a passage 140 communicating with the interior of roll 134 and through a rotary coupling 141 forming a part of the bearing 137 with a supply header 142.

An elongated opening 143 is provided in one side of the shaft 135 within the roll 134 and this elongated opening 143 is disposed diametrically opposite to the opening 144 from the passage 140 and is isolated or separated therefrom by a wall 145 resulting from the machining of the shaft 135 to provide the elongated opening 143 and the opening 144. Elongated opening 143 communicates with an outlet passage 146 in the end 138 of shaft 135 and through a rotary coupling 147 forming a part of bearing 139 with an exhaust header 148.

Disposed within the roll 134 and extending between the end walls 149 and 150 thereof is a baffle 151 which may be secured to the shaft 135 by welding or the like 152 at one side of the elongated opening 143 and may extend radially and be secured to the inner surface of the roll 134 by welding or the like 153. Baffle 151 provides a partition within the roll 134 and the operation of this baffle to effectively remove condensate 154 collected within the roll 134 will be presently described. The roll 134 may be secured to the shaft 135 in any desired manner such as by the provision of flanges 155 and 156 on the shaft 135 which may be secured to the end walls 149 and 150 by rivets 157 and 158 or by any other suitable fastening means.

In the operation of roll 134 a heating medium such as steam flows through the supply header 142, passage 140, and inlet opening 144 into the roll 134 to heat the same and during such heating condensate 154 will collect in the lower portion of the roll. Steam and vapor will be exhausted through the elongated opening 143, outlet passage 146 and exhaust header 148 and as the roll 134 continues to rotate the condensate 154 will be carried upwardly by the baffle 151 and since this baffle is located at one side of the elongated opening 143 the condensate will be directed by such baffle into the elongated opening 143 and will flow outwardly together with the steam and vapor being exhausted from the interior of roll 134. There has thus been provided a relatively simple and efficient means for removing any condensate which may collect within the heated rolls thereby maintaining the efficiency of the apparatus since any appreciable collection of such condensate would materially increase the weight of the rolls and therefore the power required to rotate the same and also the heat transfer efficiency of the rolls would be reduced by such condensate.

Since it is necessary that the temperature of the gelation roll and the vulcanizing roll be accurately controlled some means must be provided for effecting such control but since this means is largely conventional and may well include thermostatically controlled valves such control system has not been included in the drawing since it is considered that the inclusion thereof would confuse the showing without further contributing to a clear understanding of the invention.

The above described apparatus provides an effective and relatively simple means for applying and uniting a layer of foam rubber to one side of fabric such as a carpet or the like to form a laminated fabric, the apparatus including means occupying a relatively small space for effectively curing or vulcanizing the foam rubber and for cooling the laminated fabric prior to winding on a roll for storage or other disposition. The apparatus may likewise include means for embossing any desired design in the surface of the foam rubber and highly effective means has been provided for adjusting the thickness of the foam rubber layer and for maintaining the thickness of such layer uniform.

The vulcanizing portion of the apparatus serves to impart heat rapidly to the layer of foam rubber thus accelerating the vulcanizing operation and at the same time this portion of the apparatus is so constructed and arranged as to periodically expose the surface of the foam rubber layer thus permitting the escape of the moisture and vapors therefrom which materially contributes to the production of a laminated fabric having no objectionable odors. It is further to be noted that no belts are required for transporting the fabric through the apparatus since the fabric to which the layer of foam rubber is applied effectively serves as a conveying means.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. Laminated fabric making apparatus comprising a source of fabric, a spreader roll over which said fabric passes, a gelation roll spaced from said spreader roll and under which said fabric passes, means disposed between said spreader roll and said gelation roll for depositing a continuous layer of foam rubber on said fabric to form a laminated fabric, means for adjusting the spacing between said spreader roll and said gelation roll to vary the thickness of said layer of foam rubber, means for heating said gelation roll and for controlling the temperature thereof, means for cooling the surface of said gelation roll immediately prior to contact of the same with said layer of foam rubber comprising a shoe, a sponge fixed to said shoe in contact with a portion of the surface of said gelation roll and means to supply a cooling medium to said sponge, a vulcanizing chamber, a first vulcanizing roll disposed in said chamber over which said fabric and foam rubber passes with the fabric in contact with the surface of said last named roll, a pair of feed rolls engaging said fabric and foam rubber, means to drive said spreader roll, said gelation roll and said feed rolls at a related speed in order to maintain a constant tension in said fabric and prevent thin spots in said foam rubber, a series of freely rotatable vulcanizing rolls disposed in said chamber following said feed rolls, said vulcanizing rolls being arranged in staggered relationship whereby said laminated fabric follows a zig-zag path with the foam rubber and fabric alternately in contact with the surface of said vulcanizing rolls, means for supplying a heating medium to said vulcanizing rolls, means for controlling the temperature of said vulcanizing rolls, means for circulating air through said vulcanizing chamber, a cooling chamber following said vulcanizing chamber, a series of cooling rolls disposed in said cooling chamber in staggered relationship, means for supplying a cooling medium to said cooling rolls, means for circulating air through said cooling chamber, a pair of feed rolls following said cooling rolls and means for driving said last named feed rolls and said cooling rolls to pull said laminated fabric through said vulcanizing chamber and said cooling chamber.

2. Laminated fabric making apparatus comprising a source of fabric, a spreader roll over which said fabric passes, a gelation roll spaced from said spreader roll and under which said fabric passes, means disposed between said spreader roll and said gellation roll for depositing a continuous layer of foam rubber on said fabric to form a laminated fabric, means for adjusting the spacing between said spreader roll and said gelation roll to vary the thickness of said layer of foam rubber, means for heating said gelation roll and for controlling the temperature thereof, means for cooling the surface of said gelation roll immediately prior to contact of the same with said layer of foam rubber comprising a shoe, a sponge fixed to said shoe in contact with a portion of the surface of said gelation roll and means to supply a cooling medium to said sponge, a vulcanizing chamber, a first vulcanizing roll disposed in said chamber over which said fabric and foam rubber passes with the fabric in contact with the surface of said last named roll, a pair of feed rolls engaging said fabric and foam rubber, means to drive said spreader roll, said gelation roll and said feed rolls at a related speed in order to maintain a constant tension in said fabric and prevent thin spots in said foam rubber, a series of freely rotatable vulcanizing rolls disposed in said chamber following said feed rolls, said vulcanizing rolls being arranged in staggered relationship whereby said laminated fabric follows a zig-zag path with the foam rubber and fabric alternately in contact with the surface of said vulcanizing rolls, means for supplying a heating medium to said vulcanizing rolls, means for controlling the temperature of said vulcanizing rolls, a cooling chamber following said vulcanizing chamber, a series of cooling rolls disposed in said cooling chamber in staggered relationship, means for supplying a cooling medium to said cooling rolls, a pair of feed rolls following said cooling rolls and means for driving said last named feed rolls and said cooling rolls to pull said laminated fabric through said vulcanizing chamber and said cooling chamber.

3. Laminated fabric making apparatus comprising a source of fabric, a spreader roll over which said fabric passes, a gelation roll spaced from said spreader roll and under which said fabric passes, means disposed between said spreader roll and said gelation roll for depositing a continuous layer of foam rubber on said fabric to form a laminated fabric, means for adjusting the spacing between said spreader roll and said gelation roll to vary the thickness of said layer of foam rubber, means for heating said gelation roll and for controlling the temperature thereof, means for cooling the surface of said gelation roll immediately prior to contact of the same with said layer of foam rubber comprising a shoe, a sponge fixed to said shoe in contact with a portion of the surface of said gelation roll and means to supply a cooling medium to said sponge, a vulcanizing chamber, a first vulcanizing roll disposed in said chamber over which said fabric and foam rubber passes with the fabric in contact with the surface of said last named roll, a pair of feed rolls engaging said fabric and foam rubber, means to drive said spreader roll, said gelation roll and said feed rolls at a related speed in order to maintain a constant tension in said fabric and prevent thin spots in said foam rubber, a series of freely rotatable vulcanizing rolls disposed in said chamber following said feed rolls, said vulcanizing rolls being arranged in staggered relationship whereby said laminated fabric follows a zig-zag path with the foam rubber and fabric alternately in contact with the surface of said vulcanizing rolls, means for supplying a heating medium to said vulcanizing rolls, means for controlling the temperature of said vulcanizing rolls, a cooling chamber following said vulcanizing chamber, a series of cooling rolls disposed in said cooling chamber, means for supplying a cooling medium to said cooling rolls, a pair of feed rolls following said cooling rolls and means for driving said last named feed rolls and said cooling rolls to pull said laminated fabric through said vulcanizing chamber and said cooling chamber.

4. Laminated fabric making apparatus comprising a source of fabric, a spreader roll over which said fabric passes, a gelation roll spaced from said spreader roll and under which said fabric passes, means disposed between said spreader roll and said gelation roll for depositing a continuous layer of foam rubber on said fabric to form a laminated fabric, means for adjusting the spacing between said spreader roll and said gelation roll to vary the thickness of said layer of foam rubber, means for heating said gelation roll and for controlling the temperature thereof, means for cooling the surface of said gelation roll immediately prior to contact of the same with said layer of foam rubber comprising a shoe, a sponge fixed to said shoe in contact with a portion of the surface of said gelation roll and means to supply a cooling medium to said sponge, a vulcanizing chamber, a first vulcanizing roll disposed in said chamber over which said fabric and foam rubber passes with the fabric in contact with the surface of said last named roll, a pair of feed rolls engaging said fabric and foam rubber, means to drive said spreader roll, said gelation roll and said feed rolls at a related speed in order to maintain a constant tension in said fabric and prevent thin spots in said foam rubber, a series of freely rotatable vulcanizing rolls disposed in said chamber following said feed rolls, said vulcanizing rolls being arranged in staggered relationship whereby said laminated fabric follows a zig-zag path with the foam rubber and fabric alternately in contact with the surface of said vulcanizing rolls, means for supplying a heating medium to said vulcanizing rolls, means for controlling the temperature of said vulcanizing rolls, a cooling chamber following said vulcanizing chamber, a series of cooling rolls disposed in said cooling chamber, means for supplying a cooling medium to said cooling rolls, feed rolls following said cooling rolls and means for driving said last named feed rolls to pull said laminated fabric through said vulcanizing chamber and said cooling chamber.

5. Laminated fabric making apparatus comprising a source of fabric, a spreader roll over which said fabric passes, a gelation roll spaced from said spreader roll and under which said fabric passes, means disposed between said spreader roll and said gelation roll for depositing a continuous layer of foam rubber on said fabric to form a laminated fabric, means for adjusting the spacing between said spreader roll and said gelation roll to vary the thickness of said layer of foam rubber, means for heating said gelation roll and for controlling the temperature thereof, means for cooling the surface of said gelation roll immediately prior to contact of the same with said layer of foam rubber comprising a shoe, a sponge fixed to said shoe in contact with a portion of the surface of said gelation roll and means to supply a cooling medium to said sponge, a vulcanizing chamber, a first vulcanizing roll disposed in said chamber over which said fabric and foam rubber passes with the fabric in contact with the surface of said last named roll, a pair of feed rolls engaging said fabric and foam rubber, means to drive said spreader roll, said gelation roll and said feed rolls at a related speed in order to maintain a constant tension in said fabric and prevent thin spots in said foam rubber, a series of freely rotatable vulcanizing rolls disposed in said chamber following said feed rolls, said vulcanizing rolls being arranged in staggered relationship whereby said laminated fabric follows a zig-zag path with the foam rubber and fabric alternately in contact with the surface of said vulcanizing rolls, means for supplying a heating medium to said vulcanizing rolls, means for controlling the temperature of said vulcanizing rolls, a cooling chamber following said vulcanizing chamber, a series of cooling rolls disposed in said cooling chamber, means for supplying a cooling medium to said cooling rolls, and means for driving said cooling rolls to pull said laminated fabric through said vulcanizing chamber and said cooling chamber.

6. Laminated fabric making apparatus comprising a source of fabric, a spreader roll over which said fabric passes, a gelation roll spaced from said spreader roll and under which said fabric passes, means disposed between said spreader roll and said gelation roll for depositing a continuous layer of foam rubber on said fabric to form a laminated fabric, means for adjusting the spacing between said spreader roll and said gelation roll to vary the thickness of said layer of foam rubber, means for heating said gelation roll and for controlling the temperature thereof, means for cooling the surface of said gelation roll immediately prior to contact of the same with said layer of foam rubber comprising a shoe, a sponge fixed to said shoe in contact with a portion of the surface of said gelation roll and means to supply a cooling medium to said sponge, a vulcanizing chamber, a first vulcanizing roll disposed in said chamber over which said fabric and foam rubber passes with the fabric in contact with the surface of said last named roll, a pair of feed rolls engaging said fabric and foam rubber, means to drive said spreader roll, said gelation roll and said feed rolls at a related speed in order to maintain a constant tension in said fabric and prevent thin spots in said foam rubber, a series of freely rotatable vulcanizing rolls disposed in said chamber following said feed rolls, said vulcanizing rolls being arranged in staggered relationship whereby said laminated fabric follows a zig-zag path with the foam rubber and fabric alternately in contact with the surface of said vulcanizing rolls, means for supplying a heating medium to said vulcanizing rolls, means for controlling the temperature of said vulcanizing rolls, a cooling chamber following said vulcanizing chamber, a series of cooling rolls disposed in said cooling chamber, means for supplying a cooling medium to said cooling rolls, and means to pull said laminated fabric through said vulcanizing chamber and said cooling chamber.

7. Laminated fabric making apparatus comprising a source of fabric, a spreader roll over which said fabric passes, a gelation roll spaced from said spreader roll and under which said fabric passes, means disposed between said spreader roll and said gelation roll for depositing a continuous layer of foam rubber on said fabric to form a laminated fabric, means for adjusting the spacing between said spreader roll and said gelation roll to vary the thickness of said layer of foam rubber, means for heating said gelation roll and for controlling the temperature thereof, means for cooling the surface of said gelation roll immediately prior to contact of the same with said layer of foam rubber comprising a shoe, a sponge fixed to said shoe in contact with a portion of the surface of said gelation roll and means to supply a cooling medium to said sponge, a vulcanizing chamber, a first vulcanizing roll disposed in said chamber over which said fabric and foam rubber passes with the fabric in contact with the surface of said last named roll, a pair of feed rolls engaging said fabric and foam rubber, means to drive said spreader roll, said gelation roll and said feed rolls at a related speed in order to maintain a constant tension in said fabric and prevent thin spots in said foam rubber, a series of freely rotatable vulcanizing rolls disposed in said chamber following said feed rolls, said vulcanizing rolls being arranged in staggered relationship whereby said laminated fabric follows a zig-zag path with the foam rubber and fabric alternately in contact with the surface of said vulcanizing rolls, means for supplying a heating medium to said vulcanizing rolls, means for controlling the temperature of said vulcanizing rolls, a cooling chamber following said vulcanizing chamber, and means to pull said laminated fabric through said vulcanizing chamber and said cooling chamber.

8. Laminated fabric making apparatus comprising a source of fabric, a spreader roll over which said fabric passes, a gelation roll spaced from said spreader roll and under which said fabric passes, means disposed between said spreader roll and said gelation roll for depositing a continuous layer of foam rubber on said fabric to form a laminated fabric, means for adjusting the spacing between said spreader roll and said gelation roll to vary the thickness of said layer of foam rubber, means for heating said gelation roll, means for cooling the surface of said gelation roll immediately prior to contact of the same with said layer of foam rubber comprising a shoe, a sponge fixed to said shoe in contact with a portion of the surface of said gelation roll and means to supply a cooling medium to said sponge, a vulcanizing chamber, a first vulcanizing roll disposed in said chamber over which said fabric and foam rubber passes with the fabric in contact with the surface of said last named roll, a pair of feed rolls engaging said fabric and foam rubber, means to drive said spreader roll, said gelation roll and said feed rolls at a related speed in order to maintain a constant tension in said fabric and prevent thin spots in said foam rubber, a series of freely rotatable vulcanizing rolls disposed in said chamber following said feed rolls, said vulcanizing rolls being arranged in staggered relationship whereby said laminated fabric follows a zig-zag path with the foam rubber and fabric alternately in contact with the surface of said vulcanizing rolls, means for supplying a heating medium to said vulcanizing rolls, a cooling chamber following said vulcanizing chamber, and means to pull said laminated fabric through said vulcanizing chamber and said cooling chamber.

9. Laminated fabric making apparatus comprising a source of fabric, a spreader roll over which said fabric passes, a gelation roll spaced from said spreader roll and under which said fabric passes, means disposed between said spreader roll and said gelation roll for depositing a continuous layer of foam rubber on said fabric to form a laminated fabric, means for adjusting the spacing between said spreader roll and said gelation roll to vary the thickness of said layer of foam rubber, means for heating said gelation roll, means for cooling the surface of said gelation roll immediately prior to contact of the same with said layer of foam rubber comprising a shoe, a sponge fixed to said shoe in contact with a portion of the surface of said gelation roll and means to supply a cooling medium to said sponge, a vulcanizing chamber, a first vulcanizing roll disposed in said chamber over which said fabric and foam rubber passes with the fabric in contact with the surface of said last named roll, feed rolls engaging said fabric and foam rubber, means to drive said spreader roll, said gelation roll and said feed rolls at a related speed in order to maintain a constant tension in said fabric and prevent thin spots in said foam rubber, a series of freely rotatable vulcanizing rolls disposed in said chamber following said feed rolls, said vulcanizing rolls being arranged in staggered relationship whereby said laminated fabric follows a zig-zag path with the foam rubber and fabric alternately in contact with the surface of said vulcanizing rolls, means for supplying a heating medium to said vulcanizing rolls, a cooling chamber following said vulcanizing chamber, and means to pull said laminated fabric through said vulcanizing chamber and said cooling chamber.

10. Laminated fabric making apparatus comprising a source of fabric, a spreader roll over which said fabric passes, a gelation roll spaced from said spreader roll and under which said fabric passes, means disposed between said spreader roll and said gelation roll for depositing a continuous layer of foam rubber on said fabric to form a laminated fabric, means for adjusting the spacing between said spreader roll and said gelation roll to vary the thickness of said layer of foam rubber, means for heating said gelation roll, means for cooling the surface of said gelation roll immediately prior to contact of the same with said layer of foam rubber comprising a shoe, a sponge fixed to said shoe in contact with a portion of the surface of said gelation roll and means to supply a cooling medium to said sponge, a vulcanizing chamber, a first vulcanizing roll disposed in said chamber over which said fabric and foam rubber passes with the fabric in contact with the surface of said last named roll, feeding means engaging said fabric and foam rubber, means to drive said spreader roll, said gelation roll and said feeding means at a related speed in order to maintain a contant tension in said fabric and prevent thin spots in said foam rubber, a series of freely rotatable vulcanizing rolls disposed in said chamber following said feeding means, said vulcanizing rolls being arranged in staggered relationship whereby said laminated fabric follows a zig-zag path with the foam rubber and fabric alternately in contact with the surface of said vulcanizing rolls, means for supplying a heating medium to said vulcanizing rolls, a cooling chamber following said vulcanizing chamber, and means to pull said laminated fabric through said vulcanizing chamber and said cooling chamber.

11. Laminated fabric making apparatus comprising a source of fabric, a spreader roll over which said fabric passes, a gelation roll spaced from said spreader roll and under which said fabric passes, means disposed between said spreader roll and said gelation roll for depositing a continuous layer of foam rubber on said fabric to form a laminated fabric, means for heating said gelation roll, means for cooling the surface of said gelation roll immediately prior to contact of the same with said layer of foam rubber comprising a shoe, a sponge fixed to said shoe in contact with a portion of the surface of said gelation roll and means to supply a cooling medium to said sponge, a vulcanizing chamber, a first vulcanizing roll disposed in said chamber over which said fabric and foam rubber passes with the fabric in contact with the surface of said last named roll, feeding means engaging said fabric and foam rubber, means to drive said spreader roll, said gelation roll and said feeding means at a related speed in order to maintain a constant tension in said fabric and prevent thin spots in said foam rubber, a series of freely rotatable vulcanizing rolls disposed in said chamber following said feeding means, said vulcanizing rolls being arranged in staggered relationship whereby said laminated fabric follows a zig-zag path with the foam rubber and fabric alternately in contact with the surface of said vulcanizing rolls, means for supplying a heating medium to said vulcanizing rolls, a cooling chamber following said vulcanizing chamber, and means to pull said laminated fabric through said vulcanizing chamber and said cooling chamber.

12. Laminated fabric making apparatus comprising a source of fabric, a spreader roll over which said fabric passes, a gelation roll spaced from said spreader roll and under which said fabric passes, means disposed between said spreader roll and said gelation roll for depositing a continuous layer of foam rubber on said fabric to form a laminated fabric, means for heating said gelation roll, means for cooling the surface of said gelation roll immediately prior to contact of the same with said layer of foam rubber comprising a shoe, and means to supply a cooling medium to said shoe, a vulcanizing chamber, a first vulcanizing roll disposed in said chamber over which said fabric and foam rubber passes with the fabric in contact with the surface of said last named roll, feeding means engaging said fabric and foam rubber, means to drive said spreader roll, said gelation roll and said feeding means at a related speed in order to maintain a constant tension in said fabric and prevent thin spots in said foam rubber, a series of freely rotatable vulcanizing rolls disposed in said chamber following said feeding means, said vulcanizing rolls being arranged in staggered relationship whereby said laminated fabric follows a zig-zag path with the foam rubber and fabric alternately in contact with the surface of said vulcanizing rolls, means for supplying a heating medium to said vulcanizing rolls, a cooling chamber following said vulcanizing chamber, and means to pull said laminated fabric through said vulcanizing chamber and said cooling chamber.

13. Laminated fabric making apparatus comprising a source of fabric, a spreader roll over which said fabric passes, a gelation roll spaced from said spreader roll and under which said fabric passes, means disposed between said spreader roll and said gelation roll for depositing a continuous layer of foam rubber on said fabric to form a laminated fabric, means for heating said gelation roll, means for cooling the surface of said gelation roll immediately prior to contact of the same with said layer of foam rubber comprising a shoe, and means to supply a cooling medium to said shoe, a vulcanizing chamber, a first vulcanizing roll disposed in said chamber over which said fabric and foam rubber passes with the fabric in contact with the surface of said last named roll, feeding means engaging said fabric and foam rubber, means to drive said spreader roll, said gelation roll and said feeding means at a related speed in order to maintain a constant tension in said fabric and prevent thin spots in said foam rubber, a series of vulcanizing rolls disposed in said chamber following said feeding means, said vulcanizing rolls being arranged in staggered relationship whereby said laminated fabric follows a zig-zag path with the foam rubber and fabric alternately in contact with the surface of said vulcanizing rolls, means for supplying a heating medium to said vulcanizing rolls, a cooling chamber following said vulcanizing chamber, and means to pull said laminated fabric through said vulcanizing chamber and said cooling chamber.

14. Laminated fabric making apparatus comprising a source of fabric, a spreader roll over which said fabric passes, a gelation roll spaced from said spreader roll and under which said fabric passes, means disposed between said spreader roll and said gelation roll for depositing a continuous layer of foam rubber on said fabric to form a laminated fabric, means for heating said gelation roll, means for cooling the surface of said gelation roll immediately prior to contact of the same with said layer of foam rubber comprising a shoe, and means to supply a cooling medium to said shoe, a vulcanizing chamber, a first vulcanizing roll disposed in said chamber over which said fabric and foam rubber passes with the fabric in contact with the surface of said last named roll, feeding means engaging said laminated fabric, means to drive said spreader roll, said gelation roll and said feeding means at a related speed in order to maintain a constant tension in said fabric and prevent thin spots in said foam rubber, a series of vulcanizing rolls disposed in said chamber following said feeding means, said vulcanizing rolls being arranged in staggered relationship whereby said laminated fabric follows a zig-zag path with the foam rubber and fabric alternately in contact with the surface of said vulcanizing rolls, means for supplying a heating medium to said vulcanizing rolls, a cooling chamber following said vulcanizing chamber, and means to feed said laminated fabric through said vulcanizing chamber and said cooling chamber.

15. Laminated fabric making apparatus comprising a source of fabric, a spreader roll over which said fabric passes, a gelation roll spaced from said spreader roll and under which said fabric passes, means disposed between said spreader roll and said gelation roll for depositing a continuous layer of foam rubber on said fabric to form a laminated fabric, means for heating said gelation roll, means for cooling the surface of said gelation roll immediately prior to contact of the same with said layer of foam rubber, a vulcanizing chamber, a first vulcanizing roll disposed in said chamber over which said fabric and foam rubber passes with the fabric in contact with the surface of said last named roll, feeding means engaging said laminated fabric, means to drive said spreader roll, said gelation roll and said feeding means at a related speed in order to maintain a constant tension in said fabric and prevent thin spots in said foam rubber, a series of vulcanizing rolls disposed in said chamber following said feeding means, said vulcanizing rolls being arranged in staggered relationship whereby said laminated fabric follows a zig-zag path with the foam rubber and fabric alternately in contact with the surface of said vulcanizing rolls, means for supplying a heating medium to said vulcanizing rolls, a cooling chamber following said vulcanizing chamber, and means to feed said laminated fabric through said vulcanizing chamber and said cooling chamber.

16. Laminated fabric making apparatus comprising a source of fabric, a spreader roll over which said fabric passes, a gelation roll spaced from said spreader roll and under which said fabric passes, means disposed between said spreader roll and said gelation roll for depositing a continuous layer of foam rubber on said fabric to form a laminated fabric, means for heating said gelation roll, means for cooling the surface of said gelation roll immediately prior to contact of the same with said layer of foam rubber, a vulcanizing chamber, a first vulcanizing roll disposed in said chamber over which said laminated fabric passes, feeding means engaging said laminated fabric, means to drive said spreader roll, said gelation roll and said feeding means at a related speed in order to maintain a constant tension in said fabric and prevent thin spots in said foam rubber, a series of vulcanizing rolls disposed in said chamber following said feeding means, said vulcanizing rolls being arranged in staggered relationship whereby said laminated fabric follows a zig-zag path with the foam rubber and fabric alternately in contact with the surface of said vulcanizing rolls, means for supplying a heating medium to said vulcanizing rolls, a cooling chamber following said vulcanizing chamber, and means to feed said laminated fabric through said vulcanizing chamber and said cooling chamber.

17. Laminated fabric making apparatus as defined in claim 16 in which said feeding means incorporates means for embossing a design in said foam rubber.

18. Laminated fabric making apparatus comprising a source of fabric, a spreader roll over which said fabric passes, a gelation roll spaced from said spreader roll and under which said fabric passes, means disposed between said spreader roll and said gelation roll for depositing a continuous layer of foam rubber on said fabric to form a laminated fabric, means for heating said gelation roll, means for cooling the surface of said gelation roll immediately prior to contact of the same with said layer of foam rubber, a vulcanizing chamber, a first vulcanizing roll disposed in said chamber over which said laminated fabric passes, feeding means engaging said laminated fabric, a series of vulcanizing rolls disposed in said chamber following said feeding means, said vulcanizing rolls being arranged in staggered relationship whereby said laminated fabric follows a zig-zag path with the foam rubber and fabric alternately in contact with the surface of said vulcanizing rolls, means for supplying a heating medium to said vulcanizing rolls, a cooling chamber following said vulcanizing chamber, and means to feed said laminated fabric through said vulcanizing chamber and said cooling chamber.

19. Laminated fabric making apparatus comprising a source of fabric, a spreader roll over which said fabric passes, a gelation roll spaced from said spreader roll and under which said fabric passes, means disposed between said spreader roll and said gelation roll for depositing a continuous layer of foam rubber on said fabric to form a laminated fabric, means for heating said gelation roll, a vulcanizing chamber, a first vulcanizing roll disposed in said chamber over which said laminated fabric passes, feeding means engaging said laminated fabric, a series of vulcanizing rolls disposed in said chamber following said feeding means, said vulcanizing rolls being arranged in staggered relationship whereby said laminated fabric follows a zig-zag path with the foam rubber and fabric alternately in contact with the surface of said vulcanizing rolls, means for heating said vulcanizing rolls, a cooling chamber following said vulcanizing chamber, and means to feed said laminated fabric through said vulcanizing chamber and said cooling chamber.

20. Laminated fabric making apparatus as defined in claim 19 in which said heating medium is steam and in which each of the heated rolls is mounted on a shaft having an inlet passage in one end for conducting said steam to the interior of the roll, an elongated opening in one side of said shaft within said roll and communicating with an outlet passage in the opposite end of said shaft and a radially disposed baffle secured to said shaft adjacent said elongated opening and to one side thereof and secured to the inner surface of said roll to provide a partition whereby upon rotation of said roll condensate will be carried upwardly and directed into said elongated opening to be removed from said roll through said outlet passage.

21. Laminated fabric making apparatus as defined in claim 19 in which said heating medium is steam and in which each of the heated rolls is mounted on a shaft having an inlet passage in one end for conducting said steam to the interior of the roll, an elongated opening in one side of said shaft within said roll and communicating with an outlet passage in the opposite end of said shaft and a baffle secured to said shaft adjacent said elongated opening and to one side thereof and secured to the inner surface of said roll to provide a partition whereby upon rotation of said roll condensate will be carried upwardly and directed into said elongated opening to be removed from said roll through said outlet passage.

22. Laminated fabric making apparatus as defined in claim 19 in which said heating medium is steam and in which a heated roll is mounted on a shaft having an inlet passage in one end for conducting said steam to the interior of the roll, an elongated opening in one side of said shaft within said roll and communicating with an outlet passage in the opposite end of said shaft and a baffle secured to said shaft adjacent said elongated opening and to one side thereof and secured to the inner surface of said roll to provide a partition whereby upon rotation of said roll condensate will be carried upwardly and directed into said elongated opening to be removed from said roll through said outlet passage.

23. Laminated fabric making apparatus as defined in claim 19 in which said heating medium is steam and in which a heated roll is mounted on a shaft having an inlet passage in one end for conducting said steam to the interior of the roll, an opening in one side of said shaft within said roll and communicating with an outlet passage in the opposite end of said shaft and a baffle secured to said shaft adjacent said opening and to one side thereof and secured to the inner surface of said roll to provide a partition whereby upon rotation of said roll condensate will be carried upwardly and directed into said opening to be removed from said roll through said outlet passage.

24. Laminated fabric making apparatus as defined in claim 19 in which said heating medium is steam and in which a heated roll is mounted on a shaft having an inlet passage in one end for conducting said steam to the interior of the roll, an opening in one side of said shaft within said roll and communicating with an outlet passage in the opposite end of said shaft and a baffle secured to said shaft adjacent said opening and to one side thereof whereby upon rotation of said roll condensate will be carried upwardly by said baffle and directed into said opening to be removed from said roll through said outlet passage.

25. Laminated fabric making apparatus as defined in claim 19 in which said heating medium is steam and in which a heated roll is mounted on a shaft having an inlet passage in one end for conducting said steam to the interior of the roll, an opening in one side of said shaft within said roll and communicating with an outlet passage in the opposite end of said shaft and a baffle secured to said shaft adjacent said opening whereby upon rotation of said roll condensate will be carried upwardly by said baffle and directed into said opening to be removed from said roll through said outlet passage.

26. Laminated fabric making apparatus as defined in claim 19 in which said heating medium is steam and in which a heated roll is mounted on a shaft having an inlet passage for conducting said steam to the interior of the roll, an opening in said shaft within said roll and communicating with an outlet passage in said shaft and a baffle disposed within said roll whereby upon rotation of said roll condensate will be carried upwardly by said baffle and directed into said opening to be removed from said roll through said outlet passage.

References Cited in the file of this patent

UNITED STATES PATENTS

| Number | Name | Date |
|---|---|---|
| 956,602 | Pulsifer | May 3, 1910 |
| 1,369,129 | Ross | Feb. 22, 1921 |
| 1,918,937 | Shelton | July 18, 1933 |
| 2,308,951 | Novotny et al. | Jan. 19, 1943 |
| 2,339,142 | Boddle | Jan. 11, 1944 |
| 2,369,484 | Nadeau | Feb. 13, 1945 |
| 2,526,318 | Battin | Oct. 17, 1950 |
| 2,641,296 | Marco | June 9, 1953 |